United States Patent
Brülle-Drews

(10) Patent No.: US 7,925,435 B2
(45) Date of Patent: Apr. 12, 2011

(54) NAVIGATION SYSTEM FOR DETERMINING A ROUTE TO A DESTINATION

(75) Inventor: Christian Brülle-Drews, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 14 days.

(21) Appl. No.: 11/122,773

(22) Filed: May 4, 2005

(65) Prior Publication Data

US 2006/0178821 A1 Aug. 10, 2006

(30) Foreign Application Priority Data

May 4, 2004 (EP) .................................. 04010565

(51) Int. Cl.
*G01C 21/34* (2006.01)

(52) U.S. Cl. ........ 701/209; 701/201; 701/208; 701/211; 340/995.1; 340/995.17; 340/995.19

(58) Field of Classification Search .................. 701/200, 701/201, 202, 204, 206, 207, 208, 209, 213; 340/988, 995.1, 995.11, 995.12, 995.19, 340/995.2, 995.21, 995.23

See application file for complete search history.

(56) References Cited

U.S. PATENT DOCUMENTS

| 5,844,505 A * | 12/1998 | Van Ryzin ..................... 340/988 |
| 2001/0025222 A1 * | 9/2001 | Bechtolsheim et al. ...... 701/209 |
| 2003/0028319 A1 * | 2/2003 | Khavakh et al. ............... 701/209 |

FOREIGN PATENT DOCUMENTS

| EP | 0772174 | 10/1996 |
| EP | 772174 A1 * | 5/1997 |
| EP | 1077362 | 8/2000 |
| EP | 1304548 | 10/2002 |
| EP | 1304548 A2 * | 4/2003 |

* cited by examiner

*Primary Examiner* — Khoi Tran
*Assistant Examiner* — Spencer Patton
(74) *Attorney, Agent, or Firm* — The Eclipse Group LLP

(57) ABSTRACT

A pedestrian route navigation system ("PRNS") in a vehicle capable of determining a route from a final parking position of the vehicle to a predetermined destination, comprising a final parking position unit and a pedestrian route calculation unit. The PRNS may include a display unit capable of outputting data concerning the route to the predetermined destination, and a transmitting/receiving unit capable of transmitting the data to a mobile information unit of the user of the vehicle.

21 Claims, 3 Drawing Sheets

US 7,925,435 B2

NAVIGATION SYSTEM FOR DETERMINING A ROUTE TO A DESTINATION

CROSS-REFERENCE TO RELATED APPLICATIONS

This application claims priority to European Patent Application Serial No. 04010565.2 filed May 4, 2004, which application is incorporated into this application in its entirety by reference.

BACKGROUND OF THE INVENTION

1. Field of the Invention

The invention relates to a navigation system in a vehicle that determines a route to a predetermined destination and to a method for determining the route to a predetermined destination. In particular, the invention relates to a navigation system that may be utilized when the vehicle cannot be parked in the surrounding area close to the predetermined destination.

2. Related Art

In conventional navigation systems utilized in vehicles, a current position of a vehicle is detected together with other data of the operating state of the vehicle, and these data are utilized to guide the driver of the vehicle to a predetermined destination. Often, however, it is not possible to park the vehicle directly at the predetermined destination. This may be the case when the predetermined destination lies within a pedestrian area for which vehicular access is restricted. In cities especially, the parking possibilities may be restricted so that it is nearly impossible to park the vehicle near the predetermined destination that the user of the vehicle wants to reach. Furthermore, in many locations such as sport arenas, airports or leisure parks, large parking grounds exist that are located substantial distances away from the predetermined destination itself.

In other situations, a user of a vehicle that has arrived at the predetermined destination will look for a parking possibility for the vehicle. The final parking position, however, may be situated a substantial distance away from the actual predetermined destination itself.

Therefore, a need exists to provide a user of a vehicle with information such that the user may reach the predetermined destination after having parked the car at a final parking position that is remote from the predetermined destination.

SUMMARY

A pedestrian route navigation system ("PRNS") for determining a pedestrian route from a final parking position of a vehicle to a predetermined destination is disclosed. The PRNS may include a final parking position unit, a pedestrian route determination unit, a disabling/enabling unit, and a control unit. The final parking position unit may be configured to determine that a vehicle has reached the final parking position at a predetermined destination. The pedestrian route determination unit may be configured to determine a pedestrian route from the final parking position unit to the predetermined destination. The pedestrian route determination unit also may be configured to output data describing the pedestrian route to a display unit or a transmitting/receiving unit.

In an example of operation, the PRNS may perform a process that includes determining whether the vehicle has reached a final parking position for the predetermined destination; determining a route from the final parking position to the predetermined destination; and outputting data describing the route from the final parking position to the predetermined destination to a display unit or a transmitting/receiving unit. Determining the route from the final parking position to the predetermined destination may include utilizing roadmap data comprising pedestrian roadmap data and line tables data. Outputting data concerning the route from the final parking position to the predetermined destination may include both enabling and disabling the outputting of the data based on determining the complexity of the route from the final parking position to the predetermined destination.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
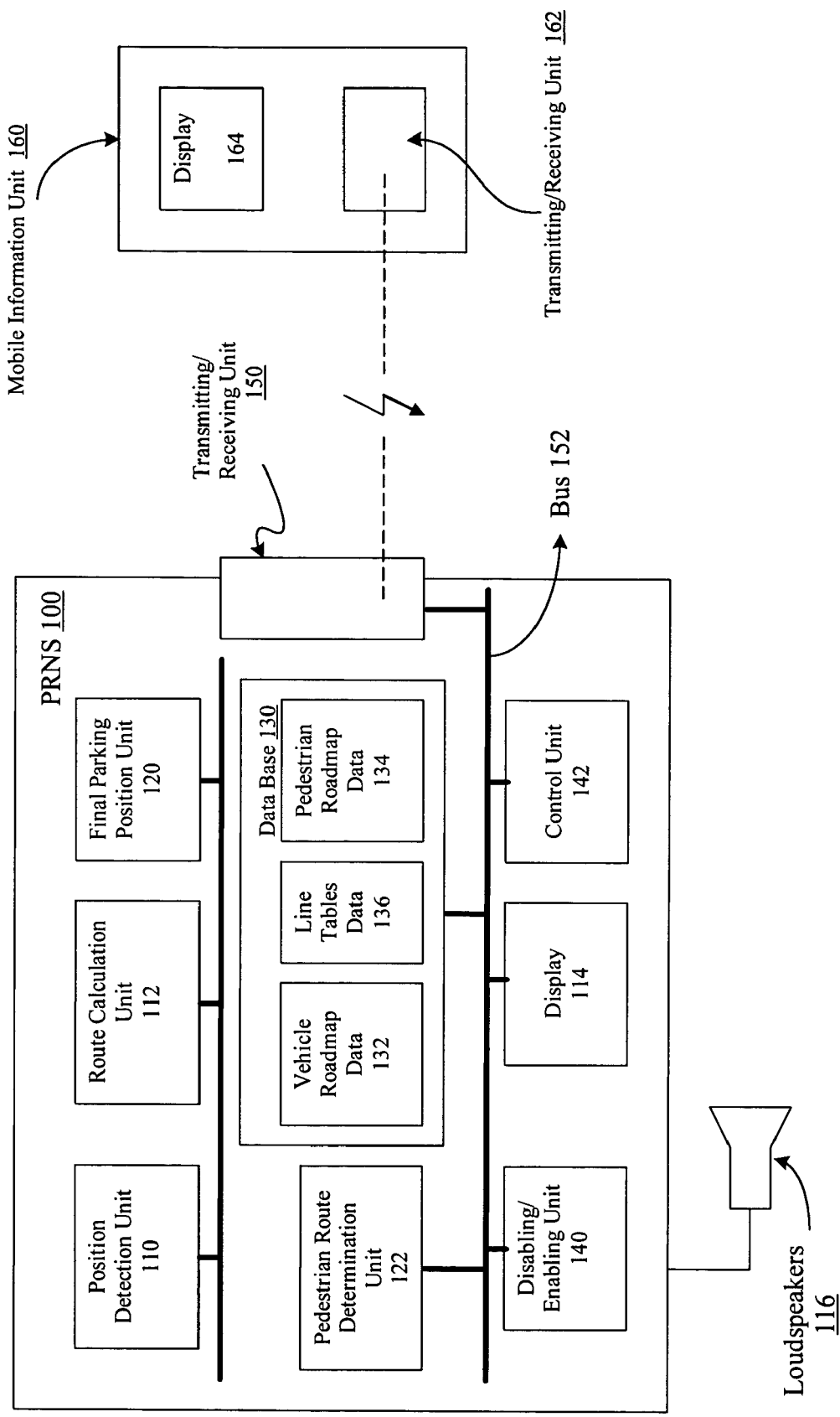
FIG. 1 is a block diagram of an example implementation of a system for indicating a pedestrian route to the predetermined destination.

In FIG. 1, a pedestrian route navigation system ("PRNS") 100 for outputting data describing the route from a final parking position of a vehicle to a predetermined destination is shown schematically. The PRNS 100 may include a position detection unit 110, a route calculation unit 112, a display 114 and/or loudspeakers 116, a final parking position unit 120, a pedestrian route determination unit 122, a data base 130, a disabling/enabling unit 140, a control unit 142, and a transmitting/receiving unit 150. These units may be in signal communication with each other via a bus 152. The data base 130 may include vehicle roadmap data 132, line tables data 136, and pedestrian roadmap data 134.

The position detection unit 110 is a device or module configured to detecting the actual position of the vehicle. The detection of the position of the vehicle may be based on data received from a satellite system such as GPS. Furthermore, the position of the vehicle may be detected using data of the operating state of the vehicle, i.e., direction changes, speed, etc. However, any other system for detecting the actual position of the vehicle may be utilized.

The route calculation unit 112 is a device or module capable of calculating the route from the actual position of the vehicle to a predetermined destination based on the actual position of the vehicle and the predetermined destination which is normally input by the driver of the vehicle. The driver of the vehicle may be informed of what route to take by utilizing a display 114 or by utilizing loudspeakers 116 of the PRNS 100. It is appreciated that the above described units are present in most navigation systems and their functioning is well-known to persons skilled in the art.

The final parking position unit 120 is a device or module configured to determine whether the final parking position has been reached. In known navigation systems, a user is informed when the user has reached the final destination. The user may be informed orally by a voice indicating that the final destination has been reached or by any other similar indications. In detecting whether the final parking position has been reached, the final parking position unit 120 may also determine whether the engine of the vehicle has been turned off. Furthermore, the actual position of the vehicle may be compared to the geographical position of the predetermined destination. As an example, if the final parking position unit 120 determines that the final parking position differs from the predetermined destination by a certain distance and the engine is turned off, it may then determine that the final parking position has been reached.

The pedestrian route determination unit 122 is a device or module configured to determine the route from the final parking position to the predetermined destination. The PRNS 100 may determine a route from the final parking position to the predetermined destination that considers the fastest and shortest route for a pedestrian. Furthermore, the word "pedestrian" does not necessarily mean that the person will walk the whole distance. Nor is the word limited solely to walking along a route, because a pedestrian route may also include sections of a route for which busses, taxis, ferry boats, etc., are utilized.

As an example, the pedestrian route may be determined using digital roadmap data. These digital roadmap data may be stored in the PRNS 100 or may be provided from outside the navigation system using wireless communication systems. In FIG. 1, data base 130 may include roadmap data, which includes vehicle roadmap data 132 utilized for determining the route to the predetermined destination for the vehicle, and may further include pedestrian roadmap data 134 for calculating a pedestrian route to the predetermined destination. In determining the pedestrian route, one-way streets and pedestrian areas may be utilized in combination with other roads in order to calculate the route to the predetermined destination. Thus, the data utilized for calculating a route for a vehicle differ from the data utilized for calculating a route for a pedestrian. Additionally, the data base 130 may also include data 136 containing line tables for shuttle busses, public transportation, and/or information about locations of entrances in large buildings or sport arenas, or any other information that may be helpful for a pedestrian who desires to reach a certain destination not utilizing his or her own vehicle because the vehicle is parked. It is appreciated that the roadmap data 132, 136, 134 need not be two or more physically separated data. In the example of an implementation shown, these data are shown as independent devices or modules of the data base 130 in order to illustrate that in determining a pedestrian route, roadmap data may be utilized other than the roadmap data utilized only for determining a vehicle route.

In addition, the pedestrian route determination unit 122 may also produce data describing the route from the final parking position to the predetermined destination. These data may describe any aspect or feature of the route and may include, by way of example, indications of the direction to the predetermined destination relative to the final parking position, e.g., "your destination is situated on your right-hand side." Additionally, the time it takes to get to the predetermined destination may be output, e.g., "the predetermined destination may be reached within two minutes walking distance." Furthermore, the exact pedestrian route to the predetermined destination may be output describing the complete route to the predetermined destination. In another example of operation, additional information concerning the pedestrian route to the predetermined destination may be output and/or additional information relating to the predetermined destination itself may be output. By way of example, the additional information concerning the pedestrian route may include the information additional transportation possibilities that can be used that for reaching the predetermined destination. This information could be, for example: "For terminal 4 (destination) please use shuttle bus no. 6. The bus will stop in front of the main exit of the parking garage." In general, the PRNS 100 may output any additional information that may be utilized by a pedestrian in order to arrive at his destination. This information may include time tables from public transportation services, etc.

The disabling/enabling unit 140 is a device or module configured to both disable and enable the outputting of data describing the route from the final parking position to the predetermined destination. As an example, when the final parking position is situated directly next to the predetermined destination, it may not be desirable to give further information indicating the route to the predetermined destination itself. Furthermore, it is possible that the user of the PRNS 100 is familiar with the neighborhood of the final parking position, so that he or she does not wish to view the data in order to get from the parking position to the predetermined destination. Because of this, the PRNS 100 may include an enable or disable button for enabling and/or disabling the outputting of the data. If the user of the vehicle always wants to be informed of the route to the predetermined destination, the enabling/disabling button may be employed in such a way that the data concerning the route are always output. Additionally, the button may be configured in such a way that the output is always disabled, so that there are no data output at all.

The control unit 142 is a device or module that may control the functioning and operation of the PRNS 100. The transmitting/receiving unit 150 is a device or module that may transmit the data describing the route from the final parking position to the predetermined destination to a mobile information unit 160. This mobile information unit 160 may be a cellular phone or a PDA or any other mobile unit that is able to receive the data from the PRNS 100 via a transmitting/receiving unit 162 and that is able to inform the user of the mobile information unit 160 of the received data, e.g., via a display 114.

The control unit 142 may also be configured to calculate a value of complexity for the pedestrian route by assigning complexity values to different sections of the route and summing these complexity values. If a certain threshold value is exceeded, the output of data is enabled or disabled.

The final parking position unit 120, the pedestrian determination unit 122, the disabling/enabling unit 140, and the control unit 142 may each be any type of processor, microprocessor, microcontroller, controller, digital signal processor ("DSP"), application specific integrated circuit ("ASIC"), or programmable machine, or similar type of device and/or module. Moreover, two or more of these units may be combined into a single device or module. A data base 130 may be any type of storage device or module capable of storing roadmap data, which roadmap data may be data received from a satellite system such as GPS or input to the PRNS 100 on a computer-readable medium (as defined below) by the user of the vehicle. A data base 130 may also store software capable of controlling the operation of any of the other devices or modules of the PRNS 100.

Figure 2:
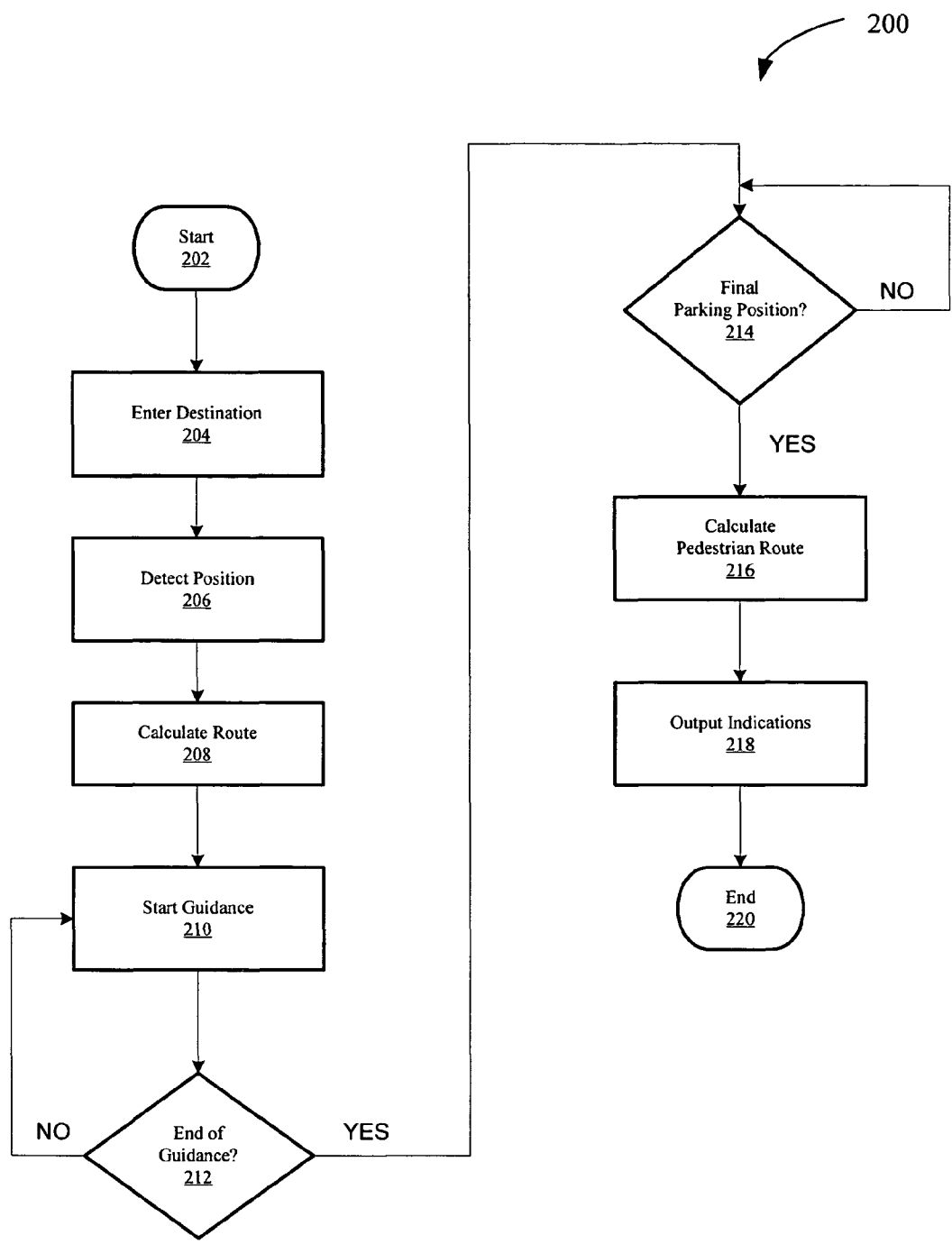
FIG. 2 is a flowchart of an example process for informing the user of the route to the predetermined destination.

In FIG. 2, the different steps for informing the user of the vehicle how to walk to the predetermined destination are shown in more detail. The process begins in step 202. In a first step 204, the predetermined destination is entered into the navigation system 100, FIG. 1, by using an input unit (not shown) of the navigation system 100, FIG. 1. The predetermined destination could also be received via the transmitting/receiving unit 150, FIG. 1, receiving data from a web server or from another communication unit. In step 206, the actual position of the vehicle may be calculated using the position detection unit 110 shown in FIG. 1. In step 208, a route for the vehicle from the actual position to the predetermined destination may be calculated and in step 210, the navigation system starts to guide the user of the vehicle by outputting indications what road to take. In decision step 212, whether the navigation is completed or not is determined, i.e., whether the vehicle has reached the predetermined destination. It is appreciated that methods utilized to detect whether the predetermined destination has been reached are well known to the person skilled in the art. If the vehicle has reached the predetermined destination, decision step 214 determines whether the vehicle has reached the final parking position. This may be accomplished by detecting whether the engine of the vehicle has been turned off. However, any other possibility for detecting whether the vehicle has reached the final parking position may be utilized, one possibility being the detection of whether the position of the vehicle changes or not for a predetermined amount of time in the neighborhood of the final parking position. Another possibility for detecting the final parking position is the detection of the vehicle door position, i.e., whether the door has been opened.

For example, it may be detected whether the driver's seat is occupied or not. If the final parking position has not been reached, the system returns to ask whether the final parking position has been reached. Additionally, whether the vehicle stops for a predetermined amount of time may also be detected. This may be helpful if the PRNS 100 is used in a taxi, for example, where the engine may not be turned off when a client departs the vehicle, yet the predetermined destination ahs been reached.

The implementation of decision step 212 to ask whether the guidance should be terminated may be incorporated so as to avoid calculating the pedestrian route from a location that is far away from the predetermined destination. With this step, for example, calculating a pedestrian route when the driver of the vehicle stops at a gas station to take up fuel, may be avoided. In decision step 212, the system may ask whether the actual position of the vehicle is within the surroundings of the predetermined destination. If the vehicle stops at a position near the predetermined destination and the engine is turned off, the system may determine that the final parking position has been reached in decision step 214.

If a determination is made that the final parking position has been reached, a pedestrian route is calculated in step 216. For calculating the pedestrian route, the pedestrian roadmap data 134, FIG. 1, are utilized and a pedestrian route is calculated also considering one-way streets, pedestrian areas, etc. In step 218, indications concerning the route to the predetermined destination are output. In this step 218, the direction of the destination relative to the final parking position, the time it takes to get there, the pedestrian route to the destination and any additional information relating to the route or to the destination itself could be output.

Figure 3:
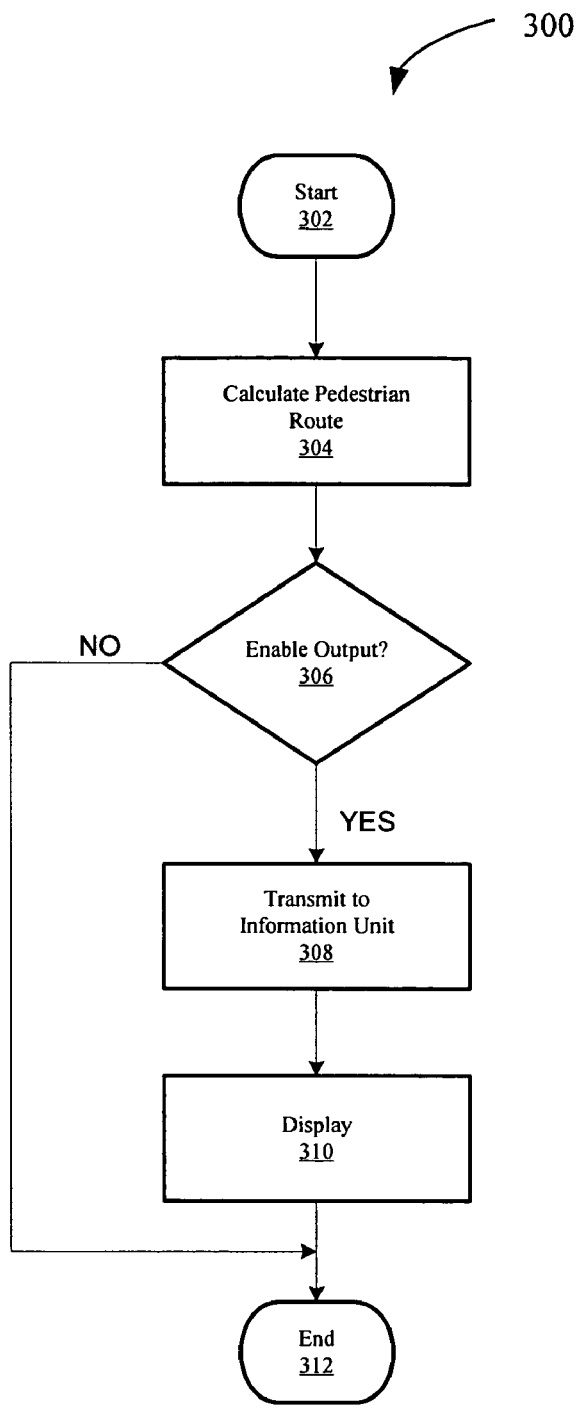
FIG. 3 is a flowchart of further detail of the example process of FIG. 2.

In FIG. 3, steps 216 and 218 of FIG. 2 are shown in more detail. This subprocess starts in step 302. When the pedestrian route is calculated in step 304, it is asked in decision step 306 whether the outputting of indications is enabled or not. The outputting of indications concerning the pedestrian route to the predetermined destination may depend on the following criteria. The route is output if the predetermined destination is situated on another road as the detected final parking position, and the predetermined destination is output when the vehicle parks in a large parking garage comprising different exits, so that the pedestrian route from the parking garage to the predetermined destination may be helpful. Furthermore, the output may be enabled when the predetermined destination can be reached within a certain amount of time, i.e., is within walking distance. Furthermore, it may be asked whether the predetermined destination is situated in a pedestrian area. If the output is enabled, the data describing the route may be transmitted to the transmitting/receiving unit 150, FIG. 1, that transmits the data to the mobile information unit 160, FIG. 1, in step 308. This mobile information unit 160, FIG. 1, may then be used by the user while walking. Additionally, the data describing the route may be displayed in step 310 on the navigation system 100, FIG. 1, in the vehicle itself. It may be decided that the data describing the route are only displayed in the vehicle itself as in step 310, or are only transmitted to the information unit as shown in step 308, or both steps may be utilized, before the system ends in step 312.

The PRNS 100 helps the user of a navigation system installed in a vehicle to get further information regarding the route from the final parking position to the predetermined destination. Using this additional information, the user can more easily find the predetermined destination. Especially in crowded areas, such as large cities or in other places where free parking space is rare, the PRNS 100 can help to find the way from the final parking position to the predetermined destination.

Persons skilled in the art will understand and appreciate that one or more processes, sub-processes, or process steps described in connection with FIGS. 2 and 3 may be performed by hardware and/or software. Additionally, the PRNS 100 may be implemented completely in software that would be executed within a microprocessor, general purpose processor, combination of processors, DSP, and/or ASIC. If a process, sub-process, or process step is performed by software, the software may reside in software memory located in the PRNS 100. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, i.e., "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A pedestrian route navigation system ("PRNS") in a vehicle for determining a pedestrian route from a final parked position of the vehicle to a predetermined destination, the navigation system comprising:
   a final parking position unit configured to determine the arrival of the vehicle at the final parked position;
   a pedestrian route calculation unit configured to determine the pedestrian route from the final parking position to the predetermined destination;
   a control unit in signal communication with the final parking position unit and the pedestrian route calculation unit, where the control unit is configured to derive data describing the pedestrian route; and
   a disabling/enabling unit in signal communication with the control unit, where the disabling/enabling unit is configured to check at least one criterion relating to the data describing the pedestrian route other than whether or not the pedestrian route exists, and configured to enable outputting of the data describing the pedestrian route when the criterion is satisfied and to disable outputting of the data when the criterion is not satisfied, where the criterion includes a determination that a structure in which the final parking position is located has more than one exit.

2. The PRNS of claim 1, further including a database in signal communication with the final parking position unit and the pedestrian route calculation unit, where the database comprises vehicle roadmap data and pedestrian roadmap data.

3. The PRNS of claim 2, where the database further comprises line tables data.

4. The PRNS of claim 1, further including a display unit in signal communication with the control unit, where the display unit is configured to provide the data describing the pedestrian route to a user of the vehicle.

5. The PRNS of claim 4, where the display unit comprises a visual display unit in the vehicle.

6. The PRNS of claim 4, where the display unit comprises audio loudspeakers in the vehicle.

7. The PRNS of claim 1, where the disabling/enabling unit is in signal communication with a switch in the vehicle, the switch having a first position corresponding to disabling the outputting of the described data and a second position corresponding to enabling the outputting of the described data, where the disabling/enabling unit is selectively disabled and enabled in response to manual switching of the switch by the user of the vehicle.

8. The PRNS of claim 1, further including a transmitting/receiving unit in signal communication with the control unit, where the transmitting/receiving unit is for transmitting the data describing the pedestrian route from the control unit to a mobile information unit.

9. The PRNS of claim 8, further including a database comprising roadmap data in signal communication with the transmitting/receiving unit, where the transmitting/receiving unit receives the roadmap data from the database.

10. The PRNS of claim 1, where the criterion comprises a determination that a road on which the predetermined destination is located is different than a road on which the final parking position is located.

11. The PRNS of claim 1, where the criterion comprises a determination that the predetermined destination may be reached by walking at a predetermined speed within a predetermined amount of time.

12. The PRNS of claim 1, where the criterion comprises a determination that the predetermined destination is located within a pedestrian area.

13. The PRNS of claim 1, where the data describing the pedestrian route from the final parking position to the predetermined destination comprise an indication of a pedestrian route to the predetermined destination, an indication of the direction to the predetermined destination, an indication of the time it takes to arrive at the predetermined destination, an indication of the distance of the path to the predetermined destination, an indication of a straight line path to the predetermined destination, and an indication of characteristics of the pedestrian route to the predetermined destination.

14. A pedestrian route navigation system ("PRNS") in a vehicle, comprising:
   means for detecting a current position of the vehicle;
   means for determining a route from the current position to a predetermined destination;
   means for detecting whether the vehicle has reached a final parking position;
   means for determining a pedestrian route from the final parking position to the predetermined destination;
   means for deriving data describing the pedestrian route from the final parking position to the predetermined destination;
   means for outputting the data describing the pedestrian route to the user;
   means for determining whether a criterion relating to the data describing the pedestrian route other than whether or not the pedestrian route exists is satisfied, and enabling or disabling said means for outputting data describing the pedestrian route in response to whether the criterion is satisfied, where the criterion includes a determination that a structure in which the final parking position is located has more than one exit.

15. The PRNS of claim 14, further comprising a data base comprising roadmap data, the roadmap data comprising vehicle roadmap data and pedestrian roadmap data.

16. The PRNS of claim 15, where said means for determining the pedestrian route from the final parking position to the predetermined destination determines a pedestrian route using the pedestrian roadmap data.

17. The PRNS of claim 14, where the data describing the pedestrian route from the final parking position to the predetermined destination comprise an indication of a pedestrian route to the predetermined destination, an indication of the direction to the predetermined destination, an indication of the time it takes to arrive at the predetermined destination, an indication of the distance of the path to the predetermined destination, an indication of a straight line path to the predetermined destination, and an indication of characteristics of the pedestrian route to the predetermined destination.

18. The PRNS of claim 14, further comprising a transmitting/receiving unit that transmits the data describing the pedestrian route from the final parking position to the predetermined destination to a mobile information unit of the user of the vehicle.

19. The PRNS of claim 14, where the criterion comprises a determination that a road on which the predetermined destination is located is different than a road on which the final parking position is located.

20. The PRNS of claim 14, where the criterion comprises a determination that the predetermined destination may be reached by walking at a predetermined speed within a predetermined amount of time.

21. The PRNS of claim 14, where the criterion comprises a determination that the predetermined destination is located within a pedestrian area.

\* \* \* \* \*